United States Patent
Al-Dhafeeri et al.

(10) Patent No.: US 11,597,871 B1
(45) Date of Patent: Mar. 7, 2023

(54) AQUEOUS WELL TREATMENT COMPOSITION AND METHOD FOR TREATING A SANDSTONE FORMATION

(71) Applicant: SAUDI ARABIAN OIL COMPANY, Dhahran (SA)

(72) Inventors: Abdullah M. Al-Dhafeeri, AlKhubar (SA); Salman Hammad Al-Thaqafi, Khafji (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/469,290

(22) Filed: Sep. 8, 2021

(51) Int. Cl.
  *E21B 43/26* (2006.01)
  *C09K 8/74* (2006.01)
  *C09K 8/66* (2006.01)

(52) U.S. Cl.
  CPC ............... *C09K 8/74* (2013.01); *C09K 8/665* (2013.01); *E21B 43/26* (2013.01); *C09K 2208/32* (2013.01)

(58) Field of Classification Search
  CPC ...... C09K 8/74; C09K 8/665; C09K 2208/32; E21B 43/26
  See application file for complete search history.

(56) References Cited

U.S. PATENT DOCUMENTS

| | | | |
|---|---|---|---|
| 3,434,545 A | 3/1969 | Bombardieri | |
| 5,238,067 A | 8/1993 | Jennings, Jr. | |
| 5,979,556 A | 11/1999 | Gallup et al. | |
| 8,895,481 B2 * | 11/2014 | Chen | C23F 11/141 507/224 |
| 9,029,313 B2 * | 5/2015 | Man | C11D 3/06 510/407 |
| 10,738,231 B2 * | 8/2020 | Reddy | C09K 8/506 |
| 2004/0009880 A1 | 1/2004 | Fu | |
| 2006/0102349 A1 | 5/2006 | Brady et al. | |
| 2006/0118302 A1 * | 6/2006 | Fuller | C09K 8/74 166/308.1 |
| 2008/0139412 A1 * | 6/2008 | Fuller | C09K 8/72 507/219 |
| 2013/0153229 A1 | 6/2013 | Abad et al. | |
| 2015/0013984 A1 * | 1/2015 | Abivin | C09K 8/03 166/300 |
| 2015/0159081 A1 | 6/2015 | Milne et al. | |
| 2017/0335175 A1 | 11/2017 | Oliveira et al. | |
| 2019/0016947 A1 * | 1/2019 | Mahmoud | C09K 8/52 |

FOREIGN PATENT DOCUMENTS

| | | |
|---|---|---|
| CN | 105985759 A | 10/2016 |
| WO | 2020/231400 A1 | 11/2020 |

* cited by examiner

*Primary Examiner* — Silvana C Runyan
(74) *Attorney, Agent, or Firm* — Osha Bergman Watanabe & Burton LLP

(57) ABSTRACT

Provided is a method for treating a sandstone formation with a well treatment composition. The method may include introducing a pre-flush pill, introducing the well treatment composition, introducing a post-flush fluid, and maintaining the wellbore such that the well treatment composition interacts with the sandstone formation. Further provided is a method that may introduce the well treatment composition as two pills, such as an organic acid pill and an inorganic acid pill. The well treatment composition may include an aqueous solution of an ammonium salt, an inorganic acid, an organic acid, and optionally one or more of a pH adjuster, a mutual solvent, a surfactant, and a corrosion inhibitor.

13 Claims, 7 Drawing Sheets

AQUEOUS WELL TREATMENT COMPOSITION AND METHOD FOR TREATING A SANDSTONE FORMATION

BACKGROUND

In a typical oil and gas well, acid may be introduced into the well for the purpose of penetrating into the porous rock. Such acid treatments, called matrix acidizing, can remove damage from a well or promote a well to improve flow, or both. Unfortunately, acid treatments to remove formation damage, especially in sandstone reservoirs, often fail to maintain reservoir integrity and result in the formation of precipitated products.

SUMMARY

This Summary is provided to introduce a selection of concepts that are further described in the Detailed Description. This summary is not intended to identify key or essential features of the claimed subject matter, nor is it intended to be used as an aid in limiting the scope of the claimed subject matter.

In one aspect, one or more embodiments disclosed relate to a method for treating a sandstone formation. The method may include introducing a pre-flush pill comprising an aqueous solution of a first brine, a first ammonium salt, and a first mutual solvent into a wellbore such that it contacts the face of the sandstone formation. The method also includes introducing a well treatment composition comprising an aqueous solution of an ammonium salt, an inorganic acid, and an organic acid into the sandstone formation, where the inorganic acid does not comprise hydrofluoric (HF) acid. The method may further include introducing a post-flush fluid comprising an aqueous solution of a second brine, a second ammonium salt, and a second mutual solvent into the wellbore such that it contacts the face of the sandstone formation. The method may then include maintaining the wellbore such that the well treatment composition interacts with the sandstone formation for a period.

In another aspect, one or more embodiments disclosed relate to a method for treating a sandstone formation that may include including introducing a pre-flush pill. The pre-flush pill may include an aqueous solution of a first brine, a first ammonium salt, and a first mutual solvent. The pre-flush pill may be introduced into a wellbore such that it contacts the face of the sandstone formation. The method may include introducing an organic acid pill comprising an aqueous solution of an ammonium salt and an organic acid into the sandstone formation. The method may further include introducing an inorganic acid pill comprising an aqueous solution of an ammonium salt and an inorganic acid into the sandstone formation. The inorganic acid may not comprise hydrofluoric (HF) acid. The method may also include introducing a post-flush fluid comprising an aqueous solution of second brine, a second ammonium salt, and a second mutual solvent into the wellbore such that it contacts the face of the sandstone formation. The method may further include maintaining the wellbore such that the well treatment composition interacts with the sandstone formation for a period, where the well treatment composition is the organic acid pill and the inorganic acid pill.

In a further aspect, one or more embodiments disclosed relate to a well treatment composition for use as an acid stimulation treatment fluid that may consist essentially of an aqueous solution of an ammonium salt, an inorganic acid, an organic acid, and optionally one or more of a pH adjuster, a mutual solvent, as surfactant, and a corrosion inhibitor, where the inorganic acid does not include hydrofluoric (HF) acid.

Other aspects and advantages of the claimed subject matter will be apparent from the following description and the appended claims.

DETAILED DESCRIPTION

Figure 1:
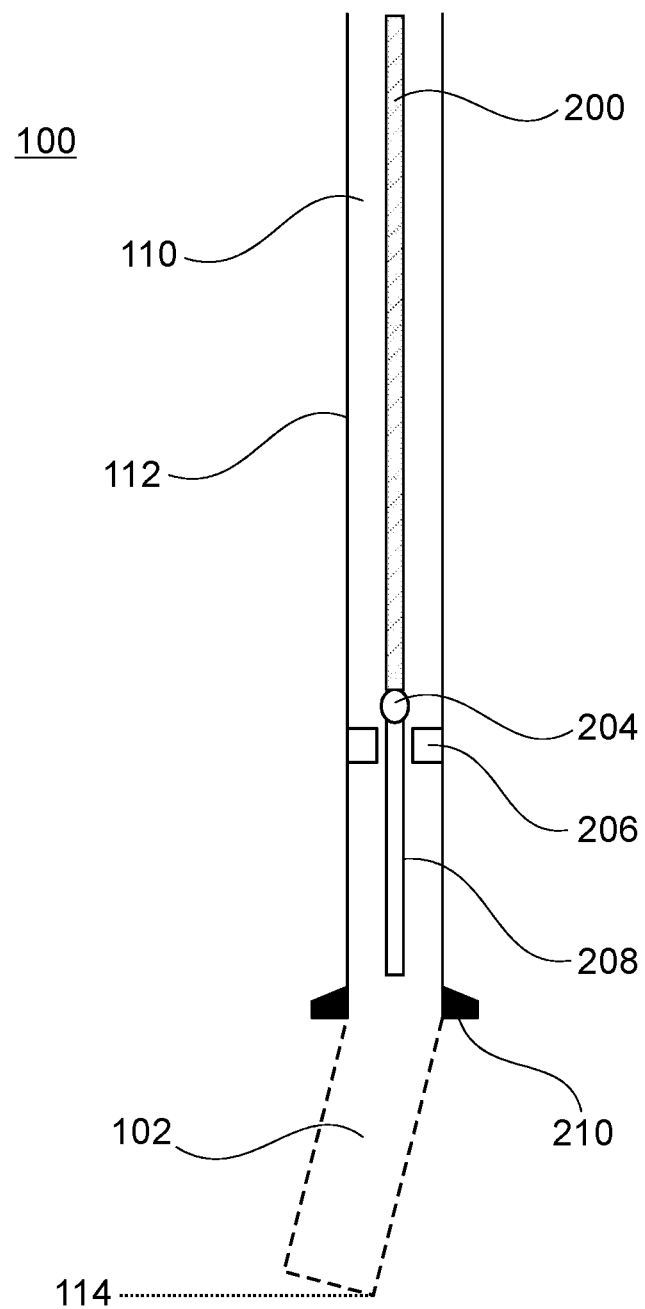
FIG. 1 shows detailed specifications of Well A, per one or more embodiments.

In the following Detailed Description, numerous details provide a thorough understanding of the disclosure. However, one of ordinary skill in the art will find that the disclosure may be practiced without these details. Moreover, one or more well-known features are briefly detailed to avoid unnecessarily complicating the description. As used herein, fluids may refer to slurries, liquids, gases, or mixtures thereof. It is to be further understood that the various embodiments described herein may be used in various stages of a well (land or offshore), such as rig site preparation, drilling, completion, abandonment etc., and in other environments, such as work-over rigs, fracking installation, well-testing installation, oil and gas production installation, without departing from the scope of the present disclosure. Further, embodiments disclosed herein may be described with terms designating orientation in reference to a vertical wellbore, but any terms designating orientation should not be deemed to limit the scope of the disclosure. For example, embodiments of the disclosure may be made with reference to a horizontal wellbore. It is to be further understood that the various embodiments described herein may be used in various orientations, such as inclined, inverted, horizontal, vertical, etc., and in other environments, such as sub-sea, without departing from the scope of the present disclosure. The embodiments are described merely as examples of useful applications, which are not limited to any specific details of the embodiments herein.

One or more embodiments of the present disclosure relate to a well treatment composition of an acid stimulation treatment fluid and a method to use the well treatment composition as a treatment in a wellbore traversing a sandstone formation.

When formation fluids or drilling fluids interact with rock and minerals of a sandstone formation, damage to the formation may result. Further damage to the sandstone formation may arise from other downhole operations, such as completions. Sandstone may include poorly consolidated rock formations as well as consolidated rock formations. Thus, a sandstone formation may be heterogeneous. The sandstone formation may vary throughout and cause rapid spending with clays and silicate precipitation when attacking the cementation minerals of sandstone with mud acid treatments.

Formation damage to the near-wellbore area in a sandstone formation can result in fines migration, scale formation, mud filtrate, and mud cake. The formation damage may further result from plugging due to particles within an introduced fluid, wettability alteration, clay deposition or swelling, emulsion, sludge, bacterial production, and water-blockage.

Formation damage may occur near the face of the wellbore, creating a skin effect. The "skin effect" relates to formation damage resulting in mud filtrate and fine particle invasion, among other things, which build up between the formation and the face of the wellbore. The damage to the sandstone formation may occur deeper than the face at the wellbore wall. Formation damage hinders injectivity into the sandstone formation. Traditional acid treatments may be used to remove formation damage and skin effect in a sandstone formation.

However, traditional acid treatments, such as stimulation fluids, may generate soluble and insoluble reaction products when introduced in a sandstone formation. This is prevalent when hydrofluoric acid (HF) or mud acid (HCl/HF) are included in the traditional acid treatment. In these instances, reaction products between the sandstone and the traditional acid treatment may precipitate and cause formation damage.

When a traditional acid treatment includes HF, such as mud acid, the well may initially show injectivity, but this initial injectivity is not sustainable over time. These wells may experience a rapid decline in injectivity after only a few weeks.

Embodiments herein relate to methods and compositions useful to stimulate water disposal and injection wells from a sandstone rock formation penetrated by a wellbore. In particular, compositions and methods herein may be used to remove the formation damage "skin effect" near the well bore that may improve the long-term injectivity of water disposal wells and water injector wells by restoring sandstone permeability.

In one or more embodiments, the well treatment composition includes a mixture of a non-hydrogen fluoride (non-HF)—containing inorganic acid, an organic acid, and ammonium salt, such as ammonium chloride ($NH_4Cl$), in an aqueous solution. The well treatment composition in some instances may further include additional additives.

The method of one or more embodiments includes a well treatment method that may be used to treat a formation, such as a sandstone formation. The well treatment method may include several steps making up a single-stage treatment, such as a pre-flushing step, a flushing step, a soaking step, and a post-flushing step.

A pre-flushing step may include introducing a pre-flush pill into a wellbore. The pre-flush pill may be aqueous and may include an ammonium salt, such as ammonium chloride ($NH_4Cl$), and a mutual solvent. A flushing step may include introducing the well treatment compositions described herein into the formation, such as a sandstone formation. A post-flushing step may include introducing a post-flush pill into the wellbore. The post-flush pill may be aqueous and may include an ammonium salt, such as ($NH_4Cl$) and a mutual solvent. A soaking step may maintain the wellbore so that the well treatment composition interacts with the sandstone formation for a period. During and after the method of one or more embodiments, the method may be performed (i.e., wellbore conditions may be maintained) such that flow back from the sandstone formation may not occur.

The well treatment composition and method of one or more embodiments may be useful for several purposes in a well traversing a sandstone formation. These purposes may include, but are not limited to, removing formation damage in a sandstone reservoir (heterogeneous or otherwise), maintaining reservoir integrity, minimizing precipitated products, and increasing well injectivity. "Injectivity" means injection rate, injection volume over time, and may relate to injection pressure. Further, by removing formation damage near the wellbore, near wellbore permeability of sandstone may be restored.

In addition, one or more embodiments of the well treatment compositions and methods may advantageously reduce acid treatment complexity, eliminate HF reactions and byproducts therefrom, and reduce clay disturbance, flow back, and overall treatment rig time as compared to traditional acid stimulation treatment fluid used for sandstone formations. The well treatment composition and method of one or more embodiments stimulates the sandstone well while dissolving calcium carbonate, clays, and mud filtrate.

Well Treatment Composition

Well treatment compositions of the acid stimulation treatment fluid herein may include at least an ammonium salt, an inorganic acid, and an organic acid.

In one or more embodiments, the well treatment composition includes an ammonium salt. The ammonium salt is aqueous soluble, and may include, but is not limited to, ammonium chloride ($NH_4Cl$). Ammonium salts may be particularly aqueous soluble in an acidic solution (pH less than 7).

The ammonium salt may be included in an amount of from about 1 to 25 weight percent (wt%), 1 to 20 wt%, 1 to 15 wt%, 1 to 12 wt%, 1 to 11 wt%, 1 to 10 wt%, 1 to 9 wt%, 1 to 8 wt%, 2 to 8 wt%, 1 to 7 wt%, 1 to 6 wt%, 2 to 6 wt%, 1 to 5 wt%, 3 to 5 wt%, or 1 to 4 wt% based on the total weight of the well treatment composition.

In a sandstone formation, clay precipitates may be produced from an acid stimulation treatment fluid. Generally, acid stimulation treatment fluid that includes ammonium chloride salt may be used to remove and dilute acid-incompatible elements, such as ions like potassium or calcium. Further, the addition of ammonium salts in an acid stimulation treatment fluid may resist precipitation of potential migrated or swelling types of clay precipitates, compared to treatments without ammonium salts. Examples of these clay precipitates may include but are not limited to sodium and potassium fluorosilicates.

Ammonium salts, such as ammonium chloride, in a fluid may also help to maintain integrity of clays as a "clay stabilizer" when the clays are in direct contact with fluid. In this way, ammonium salts may be used to condition clays that make contact with acid stimulation treatment fluid downhole. Therefore, if the formation water salinity is low (in the case of fresh water or other water of low-saline content), the concentration of ammonium chloride added to an acid stimulation treatment fluid may be high to compensate for the low salinity of the formation water. This may prevent an electrical double layer of clays. "Electrical double layer" is a concept commonly known in the art of clay chemistry. It includes a Stern layer of sorbed counterions at the clay surface, and a diffusion layer outside the Stern layer that may form an ion gradient toward a bulk (ion-containing) fluid. Therefore, ammonium salts such as $NH_4Cl$ may be added to an acid stimulation treatment fluid at a concentration designed for the job that the treatment will be used for.

In one or more embodiments, the well treatment composition includes an inorganic acid. The inorganic acid is aqueous soluble, and may include, but is not limited to, hydrochloric acid (HCl). The inorganic acid may be a composition or mixture including one or more non-HF inorganic acids.

The inorganic acid source is not particularly limited. For example, the inorganic acid source may include but is not limited to, an acid concentrate that is diluted, a pre-diluted acid concentrate, and a gas that is introduced into an aqueous solution to provide the prescribed concentration. In one or more embodiments, HCl is used in liquid form. In another one or more embodiments, HCl is used in liquid aqueous form.

Selection of the inorganic acid and its concentration is dependent upon at least the depth of the target problem, the well design, and the trajectory of the well. Some inorganic acids, such as sulfuric acid and nitric acid, may also be used, but may cause health and safety issues when included in an acid stimulation treatment fluid.

The inorganic acid may be included in an amount of from about 1 to 25 wt%, 5 to 25 wt%, 10 to 25 wt%, 1 to 20 wt%, 10 to 20 wt%, 1 to 15 wt%, 5 to 15 wt%, 1 to 12 wt%, 1 to 11 wt%, 1 to 10 wt%, 6 to 14 wt%, 7 to 13 wt%, 8 to 12 wt%, and 9 to 11 wt% based on the total weight of the well treatment composition.

In one or more embodiments, the well treatment composition includes an organic acid. The organic acid is aqueous soluble, and may include, but is not limited to, formic acid (HCOOH), acetic acid ($CH_3COOH$), and citric acid.

Advantageously, organic acids are easier to inhibit (such as with a chemical inhibitor) than inorganic acids alone. Further, organic acids may cause less corrosion on a casing pipe or other parts and equipment in a wellbore at temperatures as high as 204° C. (400° F.). Moreover, organic acids have the capability to evenly corrode steel, with a uniform distribution of corrosion, compared to HCl (and other inorganic acids) which provides pitting during corrosion.

Formic acid may be more effective than other organic acids in creating deep wormholes into the reservoir. Meaning, formic acid may have an ability to access portions of the reservoir that other organic acids may not access. In addition, formic acid may be used at high temperatures where conventional inorganic acids may not be used. Formic acid may also be considered an intermediate acid in terms of corrosion power and strength level, as its acid strength is greater than acetic acid but less than HCl.

The organic acid may be included in an amount of from about 1 to 25 wt%, 5 to 25 wt%, 10 to 25 wt%, 1 to 20 wt%, 10 to 20 wt%, 1 to 15 wt%, 5 to 15 wt%, 1 to 12 wt%, 1 to 11 wt%, 1 to 10 wt%, 6 to 14 wt%, 7 to 13 wt%, 8 to 12 wt%, or 9 to 11 wt% based on the total weight of the well treatment composition.

The well treatment composition according to various embodiments herein may also include a pH adjuster, a mutual solvent, a surfactant, and a corrosion inhibitor as additives or optional additives.

In one or more embodiments, the embodiment well treatment compositions may include at least one pH adjuster. The pH adjuster may be at least one alkali compound. Examples of alkali compounds may include, but are not limited to, lime (calcium hydroxide, calcium oxide, or a mixture thereof), soda ash (sodium carbonate), sodium hydroxide, potassium hydroxide, and combinations thereof. The alkali compounds may react with gases, such as $CO_2$ or $H_2S$ (also known as acid gases), encountered by the well treatment composition during treatment operations and prevent the gases from hydrolyzing components of the well treatment composition. Some embodiment well treatment compositions may include a pH adjuster in a range of from about 0.01 wt% to about 0.7 wt%, such as from 0.01 wt% to 0.5 wt%, from 0.01 wt% to 0.3 wt%, from 0.01 wt% to 0.1 wt%, from 0.01 wt% to 0.05 wt%, from 0.05 wt% to 0.7 wt%, from 0.05 wt% to 0.5 wt%, from 0.05 wt% to 0.3 wt%, from 0.05 wt% to 0.1 wt%, from 0.1 wt% to 0.7 wt%, from 0.1 wt% to 0.5 wt%, from 0.1 wt% to 0.3 wt%, from 0.3 wt% to 0.7 wt%, from 0.3 wt% to 0.5 wt%, and from 0.5 wt% to 0.7 wt% pH adjuster, based on the total weight of the well treatment composition. In one or more embodiments, the well treatment compositions may optionally include from 0.03 kilogram per meter cubed ($kg/m^3$) to 38.5 $kg/m^3$ (0.01 pounds per barrel, lbm/bbl, to 10 lbm/bbl) of at least one pH adjuster based on the total volume of the drilling fluid composition. The pH adjuster, when used, may be added in an amount sufficient to provide a pH value of from 4 to 7 for the overall well treatment composition. The pH adjuster may be added to the brine fluid prior to or after the main acid stimulation fluid treatment. Thus, it may be added to a pre-flush or a post-flush fluid.

The concentration of pH adjuster may vary, in a range from 2.4 to 9.6 $kg/m^3$ (20 to 80 pounds per 1000 gallons, lb/1000 gal) in the overall treatment fluid, and in a composition at a weight percent range of 0.01 wt% to about 0.7 wt% of the total composition weight.

Examples of the pH adjuster that may be used in various embodiments herein include but are not limited to K-34™ and K-35™ (available from Halliburton USA).

The mutual solvent may be added to help keep other additives in solution. Further, the mutual solvent may have some solubility or miscibility with both water and an oleaginous fluid.

In one or more embodiments, the mutual solvent may be included in an amount up to about 20 wt% based on the total weight of the well treatment composition. For example, the well treatment composition may include from about 0.1 to 20 wt%, 0.1 to 15 wt%, 0.1 to 10 wt%, 0.1 to 5 wt%, 0.1 to 4 wt%, 0.1 to 3 wt%, 1 to 20 wt%, 1 to 15 wt%, 1 to 10 wt%, 1 to 5 wt%, 1 to 4 wt%, 1 to 3 wt%, 2 to 20 wt%, 2 to 15 wt%, 2 to 10 wt%, 2 to 5 wt%, or 2 to 4 wt% mutual solvent, based on the total weight of the well treatment composition.

Suitable mutual solvents include, but are not limited to, Halliburton's (USA) MUSOL® Mutual Solvent, MUSOL® A Mutual Solvent, MUSOL® E Mutual Solvent, glycol ethers (such as ethylene glycol monobutyl ether), alcohols (such as, for example, aliphatic alcohols, glycols, polyglycols), glycol esters, alcohol ethers, aromatic solvents, other hydrocarbons, mineral oils, paraffins, and derivatives and combinations thereof. Other suitable solvents may also be used.

In general, mutual solvents in acid stimulation treatment fluid may break up hydrocarbon deposition in the near wellbore area, formation face, and perforations. These hydrocarbon depositions may include paraffins, asphaltenes, emulsions, oil wet scale, or other solids. The hydrocarbon depositions may also include minerals, rock, and other materials that are difficult to remove without a mutual solvent. Further, mutual solvents may allow an acid stimulation treatment fluid to maintain the wettability of sandstone rock to be water-wet. Mutual solvents may also reduce the adsorption of corrosion inhibitors on residual clay minerals in sandstone compared to compositions without mutual solvents. A combination of these effects from inclusion of a mutual solvent allows maximized flow within the formation after acidizing, compared to compositions without mutual solvent. A mutual solvent may also help to reduce a residual water saturation (spent acid) as a post flush stage following acid treatment.

A surfactant may be added to facilitate the generation of a stable well treatment composition. The surfactant may be a non-emulsifier, which may break up an emulsion in situ and may speed up a separation of water and oil.

The surfactant may be used in an amount, for example, in a range of from about 0.2 wt% to 0.4 wt% based on the total weight of the well treatment composition. Well treatment compositions may optionally include 0.002 to 0.004 volume percent (vol%) of at least one surfactant based on the total volume of the well treatment composition.

The surfactant may include non-ionic, cationic, anionic, and/or zwitterionic surfactants, and combinations thereof. In one or more embodiments, the surfactant includes a non-ionic non-emulsifier. An example of a non-ionic non-emulsifier surfactant is LOSURF-259™ produced by Halliburton, USA.

A corrosion inhibitor may be added to minimize a corrosive effect of the acids in the well treatment composition. For example, in traditional acid-based stimulating methods utilized in oil wells, particularly as temperatures and pressures increase, the acids are corrosive to the metal tubing and in the downhole equipment. To help prevent this, corrosion inhibitors may be added to the acids. The corrosion inhibitors act to coat the metal thereby minimizing the corrosive effect of the acids. As temperatures and pressures increase, acid reactivity may also increase. Thus, an increased amount of corrosion inhibitor may be needed to compensate for the increased reactivity.

The corrosion inhibitor may be used in an amount in a range of from about 0.5 wt% to 1.0 wt% based on the total weight of the well treatment composition. Well treatment compositions may optionally include from 0.005 vol% to 0.01 vol% of at least one corrosion inhibitor based on the total volume of the well treatment composition.

Example corrosion inhibitors include, but are not limited to, alcohols such as methanol, propanol, or propargyl alcohol, ethoxylated alcohols, acids such as thioglycolic acid or fatty acids, amines, ethoxylated amines, ammonia, quaternary ammonium salts, acetone, morpholine, oxygen scavengers, thioureas, polymers, olefins, and combinations thereof.

In one or more embodiments, the corrosion inhibitor is alcohol-based. An "alcohol-based corrosion inhibitor" includes an alcohol as its major component where the weight of alcohol is greater than or equal to 30 wt% alcohol compared to the total weight of the corrosion inhibitor. An example of an alcohol-based corrosion inhibitor is HAI-OS™, having 30 wt% methanol or more and 5 wt% propargyl alcohol or more compared to the total weight of the corrosion inhibitor. Another example of an alcohol-based corrosion inhibitor is MSA-III™, having 30 wt% isopropanol or more compared to the total weight of the corrosion inhibitor. HAI-OS™ and MSA-III™ are produced by Halliburton, USA.

In one or more embodiments, the well treatment composition may be mixed uphole and introduced into the formation. Such a mixture of the well treatment composition includes weight percentages of components as previously described.

In one or more other embodiments, the well treatment composition may be mixed downhole, introduced into the wellbore in two or more pills. When introduced in separate pills, the pills may include a flush pill, an organic acid pill, an inorganic acid pill, and a neutralization pill.

The flush pill may be a pre-flush pill or a post-flush pill. The flush pill may contain water, pH adjuster, ammonium salt such as ammonium chloride, and mutual solvent. An example of the flush pill may contain volume ranges of components such as 85 to 98 vol% or 90 to 95 vol% water, 0.0001 to 0.001 vol% pH adjuster, 0.001 to 0.1 vol% or 0.01 to 0.1 vol% ammonium chloride, and 0.001 to 0.1 vol% or 0.01 to 0.1 vol% mutual solvent, where the volume percent ranges are compared to the total volume percent of the flush pill.

The organic acid pill may contain water, organic acid (such as formic acid), corrosion inhibitor, surfactant, and an ammonium salt such as ammonium chloride. An example organic acid pill may contain volume ranges of components such as 75 to 90 vol% or 80 to 90% water, 5 to 15 vol% or 8 to 12% organic acid, 0.001 to 0.1 vol% or 0.001 to 0.01 vol% corrosion inhibitor, and 0.001 to 0.1 vol% or 0.01 to 0.1 vol% ammonium salt (such as ammonium chloride), where the volume percent ranges are compared to the total volume percent of the organic acid pill.

The inorganic acid pill may contain water, HCl (such as a 31% weight to weight, "w/w" HCl aqueous "(aq)"), corrosion inhibitor, surfactant, and an ammonium salt such as ammonium chloride. An example inorganic acid pill may contain volume ranges of components such as 50 to 80 vol% or 60 to 70 vol% water, 20 to 40 vol% or 25 to 35 vol% HCl (31% w/w HCl (aq)) (or about 5 to 20 vol% HCl), 0.001 to 0.1 vol% or 0.001 to 0.01 vol% corrosion inhibitor, 0.001 to 0.1 vol% or 0.001 to 0.01 vol% surfactant, and 0.001 to 0.1 vol% or 0.01 to 0.1 vol% ammonium salt (such as ammonium chloride), where the volume percent ranges are compared to the total volume percent of the inorganic acid pill.

The neutralization pill may contain water and pH adjuster. An example of the neutralization pill may contain volume ranges of pH adjuster such from 0.0001 to 0.1 vol%, 0.001 to 0.1 vol%, or 0.001 to 0.01 vol% pH adjuster, where the pH adjuster volume percent ranges are compared to the total volume percent of the neutralization pill. The remaining vol% in the total volume of the neutralization pill may be water.

Each of the pills may be aqueous based. The water of the aqueous phase may be any form of water, including, but not limited to, deionized water; filtered or raw fresh waters; mineral waters; filtered, raw or synthetic seawater; brackish water; synthetic or natural brines; salt water; formation water; and produced water. The water may contain an amount of organics from natural or artificial sources as long as the function of the well treatment composition, which is to provide the ammonium salt, the inorganic acid, the organic acid, and other additives as described, is not inhibited. The water may contain an amount of minerals or metals from natural or artificial sources as long as the function of the well treatment composition is not inhibited. The water may contain an amount of monovalent ions, multivalent ions, and combinations thereof.

In one or more embodiments, the well treatment composition has "low acidity," meaning an acid concentration of about 20 wt% or less of the total well treatment composition. For example, low acidity may include an acid concentration in a range of 1 to 20 wt%, 5 to 20 wt%, 10 to 20 wt%, 15 to 20 wt%, 1 to 15 wt%, 5 to 15 wt%, 10 to 15 wt%, 1 to 10 wt%, 5 to 10 wt%, or 1 to 5 wt%, where the acid concentration (wt%) is relative to the total weight of the well treatment composition. This low acidity allows for deep distance penetration compared to compositions having a greater acidity.

In one or more embodiments, the well treatment composition also has low acid strength. As used herein, acid strength relates to a tendency of the acid to dissociate. For example, low acid strength includes a weak acid, such as formic acid, which may allow for deeper distance penetration in a sandstone formation compared to a strong acid, such as HF. A low acid strength may result from a combination of a weak acid and a strong acid, such as formic acid and HCl, rather than a combination of strong acids, for example, HCl and HF.

The well treatment composition of one or more embodiments, besides having low acidity, eliminates a need for a flowback stage during acid treatment of a sandstone wellbore.

Without wanting to be bound by theory, the spent acid stimulation treatment fluid may force deeper into the formation after a regular injection process is reestablished with an improved injectivity index (using the composition and method of one or more embodiments). No flowback stage improves cost-effectiveness and is less environmentally harmful compared to a method that includes a flowback stage. In one or more embodiments, nitrogen is not needed to initiate flowback and neutralization and disposal of flowback fluids are unnecessary. In addition, due to complexities of a sandstone formation, no flowback stage may eliminate fines migration, sand production, and additional damages due to precipitation and clays disturbances compared to when the method includes a flowback stage.

In one or more embodiments, well treatment compositions herein may include organic acid and inorganic acid at a weight ratio (organic to inorganic) in the range of 0.5:1 to 2:1, such as 0.8:1 to 1.25:1 or 0.9:1 to 1.1:1. In other embodiments, well treatment composition may have a 1:1 mass ratio of organic acid to inorganic acid. The weight ratio used may depend on the respective acids used, as well as the desired low acidity and low acid strength to be used for treating a particular formation.

Well Treatment Methods

In one or more embodiments, the well treatment method includes steps of pre-flushing, flushing, post-flushing, and soaking. The well treatment method may be performed, for example, in a well that traverses a sandstone formation. Such a well may include but is not limited to a production well, an injector well, and a disposal well, as well as an open hole and a cased hole well.

In one or more embodiments, a step of formation damage identification and selection of the appropriate acid stimulation treatment fluid (or well treatment fluid) composition and method parameters occurs before applying the method. For example, formation damage identification may include collecting rock minerology data to predict filter cake clays disturbance and plugging of solids in the formation. Other formation information may be collected regarding physical and chemical properties of the formation including, but not limited to, chemical solubility, sand tendencies, permeability, porosity, mineralogy, and rock strength. The formation damage identification and formation information may aid in selecting the appropriate acid stimulation treatment fluid. Next, selection of the appropriate stimulation treatment may include selection of composition components and ratios, soaking time, and various other parameters herein.

A pre-flushing step introduces a pre-flush pill into the wellbore. The pre-flushing step cleans the wellbore and water-wets the formation face and potentially water-wets a portion of the sandstone formation near the wellbore.

As previously described, the pre-flush pill includes water (or brine), ammonium chloride, and one or more mutual solvent. When the components of the pre-flush pill are used in a subsequent, later pill (not a pre-flush pill), the components of the pre-flush pill may be called "first," such as a first brine, a first ammonium chloride, or a first mutual solvent (or a first one or more mutual solvent). Components of the subsequent pill (such as a post-flush pill) may be labelled "second," in the same manner (a second brine, a second ammonium chloride, or a second mutual solvent, or a second one or more mutual solvent).

In one or more embodiments, the pre-flush pill does not include acid. When the pre-flush pill includes brine, the brine may include salts, including but not limited to alkali metal halides, such as chlorides, hydroxides, or carboxylates. In one or more embodiments, salts included as part of the aqueous-based fluid may include salts that disassociate into ions of sodium, calcium, cesium, zinc, aluminum, magnesium, potassium, strontium, silicon, lithium, chlorides, bromides, carbonates, iodides, chlorates, bromates, formates, nitrates, sulfates, phosphates, oxides, and fluorides, and combinations thereof. In one or more embodiments, the well treatment compositions or pre-flush pill may comprise one or more salts in an amount that ranges from about 1 to about 300 lbm/bbl (pounds per barrel) (1 lbm/bbl=2.85 kg/m$^3$). For example, the well treatment compositions or pre-flush pill may contain the one or more salts in an amount ranging from a lower limit of any of 1, 10, 50, 80, 100, 120, 150, 180, 200, 250 and 280 lbm/bbl, to an upper limit of any of 20, 30, 40, 50, 70, 100, 120, 150, 180, 200, 220, 240, 260, 280 and 300 lbm/bbl, where any lower limit can be used in combination with any mathematically-compatible upper limit.

The concentration of salt (calcium chloride) in the brine of the pre-flush and pre-flush pill is in an amount ranging from about 1 lbm/bbl to about 150 lbm/bbl.

Compositions of the pre-flush pill are previously described. Further, the pre-flush pill may include from about 1 to 15 wt% of ammonium chloride ($NH_4Cl$) compared to the total weight of the pre-flush pill. For example, the pre-flush pill may include ammonium chloride in a range of from 1 to 10 wt%, 1 to 5 wt%, 1 to 4 wt%, 2 to 15 wt%, 2 to 10 wt%, 2 to 5 wt%, 3 to 15 wt%, 3 to 10 wt%, or 2 to 5 wt% of ammonium chloride compared to the total weight of the pre-flush pill.

The pre-flush pill may further include from about 1 to 10 wt% of mutual solvent compared to the total weight of the pre-flush pill. The mutual solvent may include one or more types of mutual solvent. For example, the pre-flush pill may include mutual solvent in the range from a lower limit of 0.1 wt%, 1 wt%, or 2 wt%, to an upper limit of 3 wt%, 4 wt%, 5 wt%, 6 wt%, 7 wt%, 8 wt%, 9 wt%, or 10 wt% mutual solvent compared to the total weight of the pre-flush pill.

At the pre-flushing step, the pre-flush may be introduced into the well in an amount in the range from about 0.1 to 20 gallons per foot (gal/ft). For example, the pre-flush pill may be introduced into the wellbore in an amount in the range from a lower limit of 0.1 gal/ft, 1 gal/ft, 1.5 gal/ft, or 1.9 gal/ft, to an upper limit of 3 gal/ft, 4 gal/ft, 5 gal/ft, 6 gal/ft, 7 gal/ft, 8 gal/ft, 9 gal/ft, 10 gal/ft, 11 gal/ft, 12 gal/ft, 13 gal/ft, 14 gal/ft, 15 gal/ft, 16 gal/ft, 17 gal/ft, 18 gal/ft, 19 gal/ft, or 20 gal/ft. The distance in feet relates to a total height of the wellbore traversing the formation being treated.

A flushing step stimulates the formation by introducing the well treatment composition of one or more embodiments. The flushing step may introduce the organic acid pill and the inorganic acid pill into the formation. Compositions of the well treatment composition, the organic acid pill, and the inorganic acid pill are previously described. In one or more embodiments, an organic acid pill is introduced prior to an inorganic acid pill.

During the flushing step, the organic acid pill and the inorganic acid pill may be introduced into the formation at an amount of between about 0.1 to 20 gallons per foot (gal/ft). For example, the organic acid or inorganic acid pill may be introduced in the range from a lower limit of 0.1 gal/ft, 1 gal/ft, 2 gal/ft, 3 gal/ft, 4 gal/ft, 5 gal/ft, 6 gal/ft, 7 gal/ft, 8 gal/ft, or 9 gal/ft, to an upper limit of 10 gal/ft, 11 gal/ft, 12 gal/ft, 13 gal/ft, 14 gal/ft, 15 gal/ft, 16 gal/ft, 17 gal/ft, 18 gal/ft, 19 gal/ft, or 20 gal/ft.

A post-flushing step introduces a post-flush pill into the formation. The post-flushing step removes the acid mixture from the wellbore (helps push the acid into or maintain the acid within the formation). As previously described, the post-flush pill includes water (or brine), ammonium chloride, and one or more mutual solvent. In one or more embodiments, the post-flush fluid does not include acid.

The post-flush fluid may include brine. The brine may include salts, such as calcium chloride, at a weight percent of from about 1.0 to 5.0 wt%.

The post-flush pill may include from about 1 to 10 wt% of ammonium chloride ($NH_4Cl$) compared to the total weight of the post-flush pill. For example, the post-flush pill may include ammonium chloride in a range of from 1 to 10 wt%, 1 to 5 wt%, 1 to 4 wt%, 2 to 15 wt%, 2 to 10 wt%, 2 to 5 wt%, 3 to 15 wt%, 3 to 10 wt%, or 2 to 5 wt% of ammonium chloride compared to the total weight of the post-flush pill.

The post-flush pill may further include from about 1 to 10 wt% of mutual solvent compared to the total weight of the post-flush pill. The mutual solvent may include one or more types of mutual solvent. For example, the post-flush pill may include mutual solvent in the range from a lower limit of 0.1 wt%, 1 wt%, or 2 wt%, to an upper limit of 3 wt%, 4 wt%, 5 wt%, 6 wt%, 7 wt%, 8 wt%, 9 wt%, or 10 wt% mutual solvent compared to the total weight of the post-flush pill.

During the post-flushing step, the post-flush pill may be introduced into the wellbore in an amount in the range from about 0.1 to 20 gallons per foot (gal/ft). For example, the post-flush pill may be used in an amount in the range from a lower limit of 0.1 gal/ft, 1 gal/ft, 1.5 gal/ft, or 1.9 gal/ft, to an upper limit of 3 gal/ft, 4 gal/ft, 5 gal/ft, 6 gal/ft, 7 gal/ft, 8 gal/ft, 9 gal/ft, 10 gal/ft, 11 gal/ft, 12 gal/ft, 13 gal/ft, 14 gal/ft, 15 gal/ft, 16 gal/ft, 17 gal/ft, 18 gal/ft, 19 gal/ft, or 20 gal/ft.

A soaking step follows the post-flushing step, maintaining the wellbore for a period so that no flow-back occurs during or after acidification. In one or more embodiments, the soaking step may be in the range of about 4 hours to about 24 hours to complete acid spending. For example, the period of soaking may be in a range from a lower limit of 4 hours, 5 hours, 6 hours, 7 hours, 8 hours, or 9 hours, to an upper limit of 10 hours, 11 hours, 12 hours, 13 hours, 14 hours, 15 hours, 16 hours, 17 hours, 18 hours, 19 hours, 20 hours, 21 hours, 22 hours, 23 hours, or 24 hours.

Although the distance of penetration of the composition into the formation may vary by factors well known in the art, the concentration resulting from the soaking step is envisaged to reach a distance of about 5 feet (about 1.5 meters) from the wellbore face into the formation. From this distance further into the formation, the concentration of the composition in the formation asymptotically decreases, until no further soaking is envisaged to occur at a distance of about 5 feet (about 1.5 meters) from the wellbore face into the formation.

By introducing the well treatment composition of one or more embodiments by the method prescribed, formation damaging materials such as calcium carbonate and mud filter cake may be removed without flow back.

In one or more embodiments, the method is a single stage treatment. Among other things, the single stage treatment means that a flow back is not conducted. This aids in eliminating sand failure and plugging material at the sand face.

The sand face (the face of the sandstone formation), and sandstone formations in general are known to be a complex mineral composition consisting of silica, calcite, feldspars, and clays. The stimulation of sandstone reservoirs utilizing conventional acid stimulation treatment fluid may compromise the sandstone by increasing formation damage rather than removing a formation damage, especially with a flowback procedure. A common flowback stage after soaking of a conventional acid stimulation treatment fluid may create sand failure due to dissolution of the cemented portion of the sandstone around silica and other minerals. Therefore, the method of one or more embodiments does not include a flowback stage. In addition, clays disturbance may occur due to salinity changes that result in swelling and/or fines migrations. This phenomenon may damage the sand face during a flowback stage.

EXAMPLES

The following examples include field trials conducted on newly drilled disposal wells using the well treatment composition and the methods of one or more embodiments. The examples include preparation of Well A and Well B, procedures, pre-acid stimulation injectivity tests, post-acid stimulation injectivity tests, and select fluid compositions.

Well A

"Well A" is a newly drilled barefoot, open-hole completion in the Burgan (sandstone) Formation. FIG. 1 and Table 1 show detailed specifications of Well A.

TABLE 1

Well A Specifications.

| Entry | Detail | Specification |
| --- | --- | --- |
| 1 | Open hole or Cased hole | Open hole |
| 2 | Total depth in measured distance | 8,650 feet |
| 3 | Total depth in true vertical depth | 8,187.65 feet |
| 4 | Formation details | Sandstone formation: ≈170° F. & ≈2,600-psi at 6,779 ft TVD (0.381-psi/ft) |
| 5 | Working Pressure Limit | 5,000 psi |

FIG. 1 shows a wellbore 100 of Well A 102, defined by a wellbore wall 112 and has a total depth 114. An annular space 110 is between the wellbore wall and the tubing 200. A packer 206 and casing (CSG) shoe 210 are installed as shown, and the tubing of FIG. 1 is coupled or connected to a circulating valve 204 and lower tubing 208.

Preparation of Well A began by running a drill stem test (DST) string in hole with drill pipe. The flow head was rigged up, and the DST string was spaced out to position. Slickline drift string was then lowered. The string passed a pressure test against tubing-fill test valve. A packer was set at a depth of 6,688' MD, and 6,608' TVD.

The contents of the tubing were displaced with a fresh water cushion for under balance. The well was opened for a clean-up flow period. After a period, the choke size was increased with no return. The well was closed to rig up coiled tubing.

Treated water for injectivity testing was pumped to the drilling pit, while continuing to rig up coiled tubing equipment. Coiled tubing began running in hole while pumping nitrogen. A slug was placed at the surface and the choke size was decreased. After the slug was placed at the surface, fresh water, brine, and mud were initially recovered. This recovery continued until formation water was recovered. Nitrogen pumping was stopped, and the coiled tubing began being pulled out of hole toward the surface, while recovery continued. Clear formation water was recovered as the coiled tubing neared the surface. The crown valve was closed and only nitrogen was at the surface, without further recovery.

Well A: Injectivity #1 (Comparative Example 1)

Comparative Example 1 and inventive Example 1 were performed in Well A. The interval tested in Well A was at a depth of 6,935' to 9,127'. The height of this interval is 2192'.

Figure 2A:
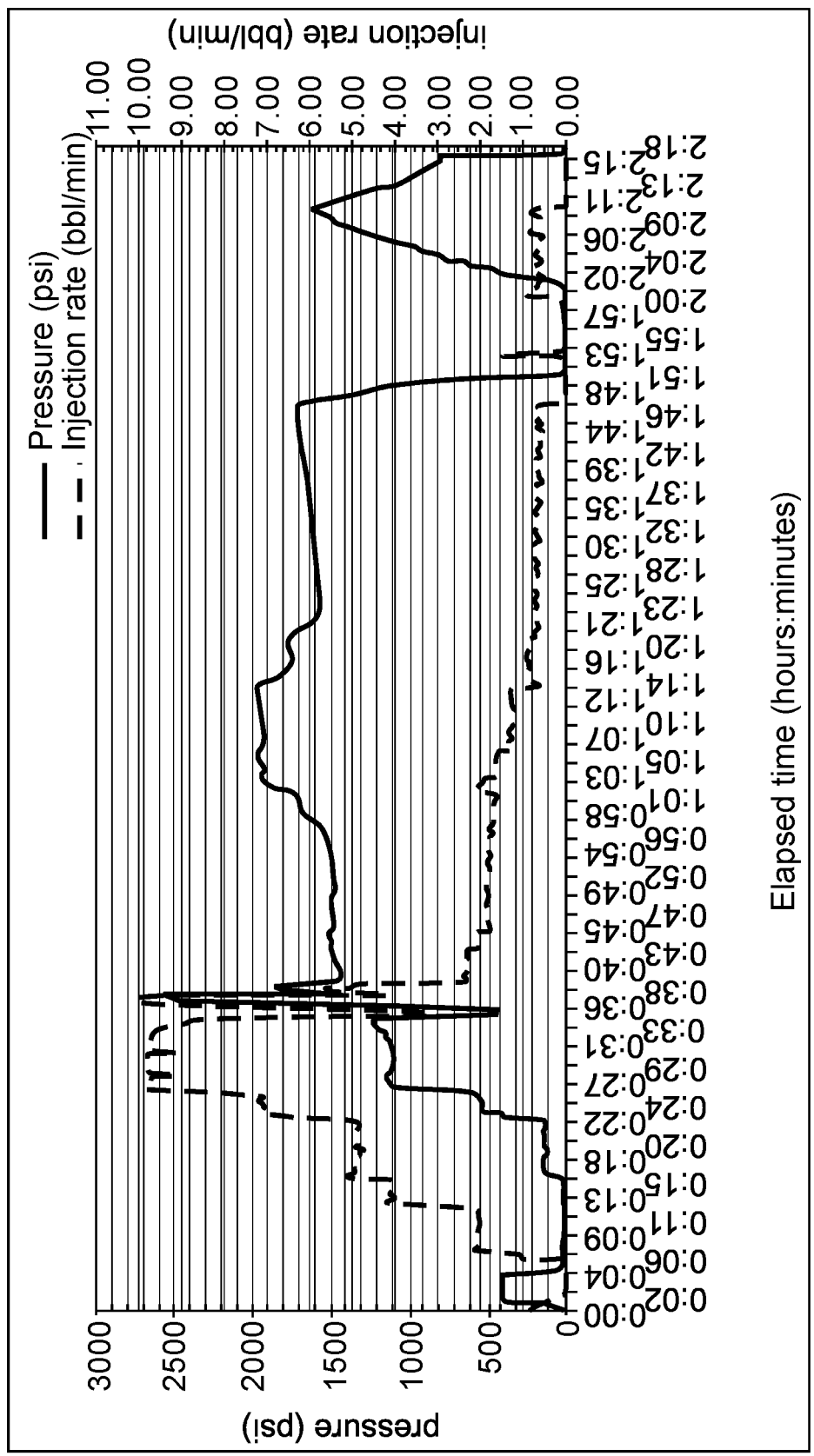
FIG. 2A shows the Injectivity #1 test on Well A, per one or more embodiments.

After the flow back with nitrogen via coiled tubing, Injectivity #1 test was performed. The wellbore started to be filled with clean and clear saline water, having 124,000 mg/L (saline/salt). The Injectivity #1 test is shown in FIG. 2A and Table 2.

Fresh water was pumped to fill the hole (Entry 1, Table 2). When the hole was filled with water, the test began (Entry 3, Table 2). Shortly after, the injection rate was increased (Entries 4 and 5, Table 2). The pump failed at Entry 6 (Table 2) and attempts were made to reestablish injection pressure. Once injection pressure was reestablished (Entry 7, Table 2), the injection was restarted. The injection rate was decreased (Entries 8 and 9, Table 2) and continued to decrease (Entries 10-15, Table 2) until stopping (Entry 16, Table 2). The total introduced water at the stop of Injectivity #1 was about 236 bbls. A "barrel" of fluid contains 42 gallons of fluid, or about 119 liters of fluid.

TABLE 2

Well A Injectivity #1, Comparative Example 1.

| Entry | Time (hour:minute) | Duration (hour:minute) | Injectivity (Injection rate in bbls/min) | Injectivity (Injection rate in bbls/day) | Injection Pressure (psi) |
|---|---|---|---|---|---|
| 1 | 0:00 | | 2 | 2,880 | 0 |
| 2 | 0:04 | 0:04 | 4 | 5,760 | 0 |
| 3 | 0:09 | 0:05 | 5 | 7,200 | 150 |
| 4 | 0:16 | 0:07 | 7 | 10,080 | 500 |
| 5 | 0:19 | 0:03 | 10 | 14,400 | 1150 |
| 6 | 0:27 | 0:08 | 3 | 4,320 | 400 |
| 7 | 0:29 | 0:02 | 10 | 14,400 | 2400 |
| 8 | 0:30 | 0:01 | 6 | 8,640 | 1800 |
| 9 | 0:32 | 0:02 | 3 | 4,320 | 1500 |
| 10 | 0:37 | 0:05 | 2 | 2,880 | 1500 |
| 11 | 0:51 | 0:14 | 2 | 2,880 | 1600 |
| 12 | 1:56 | 1:05 | 2 | 2,880 | 2000 |
| 13 | 1:59 | 0:03 | 1 | | 2000 |
| 14 | 2:07 | 0:08 | 0.5 | | 1750 |
| 15 | 2:13 | 0:06 | 0.5 | | 1600 |
| 16 | 2:36 | 0:23 | 0 | | 0 |

Table 2 illustrates the injectivity test prior to applying the method of one or more embodiments on Well A. The injectivity can be seen in Table 2 as declining until reaching a value of 0.5 bbls/min at a pressure of 1,750 psi.

After Injectivity #1, the well treatment method of one or more embodiments was performed on Well A. Coiled tubing was run in hole and the pre-flush pill was introduced. The coiled tubing did not pass 7295' after several trials without success. The coiled tubing was tagged at 7300'.

The flushing step included an acid wash across 6,935' to 7,295' (360' below). Next, the flushing step began with introducing 42 bbls of the organic acid pill. About 45 minutes later, an additional 42 bbls of the organic acid pill were introduced. 15 minutes following the introduction of the organic acid pill, 84 bbls of the inorganic acid pill were introduced. About 25 minutes after the flushing step, the hole was displaced with 351 bbls of post-flush pill (including treated brine) in the post-flushing step. Pumping was stopped after the post-flushing step and the coiled tubing was pulled out of hole to the surface. The fluid mixture soaked in the well for 4 hours. No flow-back step was performed.

Well A: Injectivity #2 (Example 1)

Figure 2B:
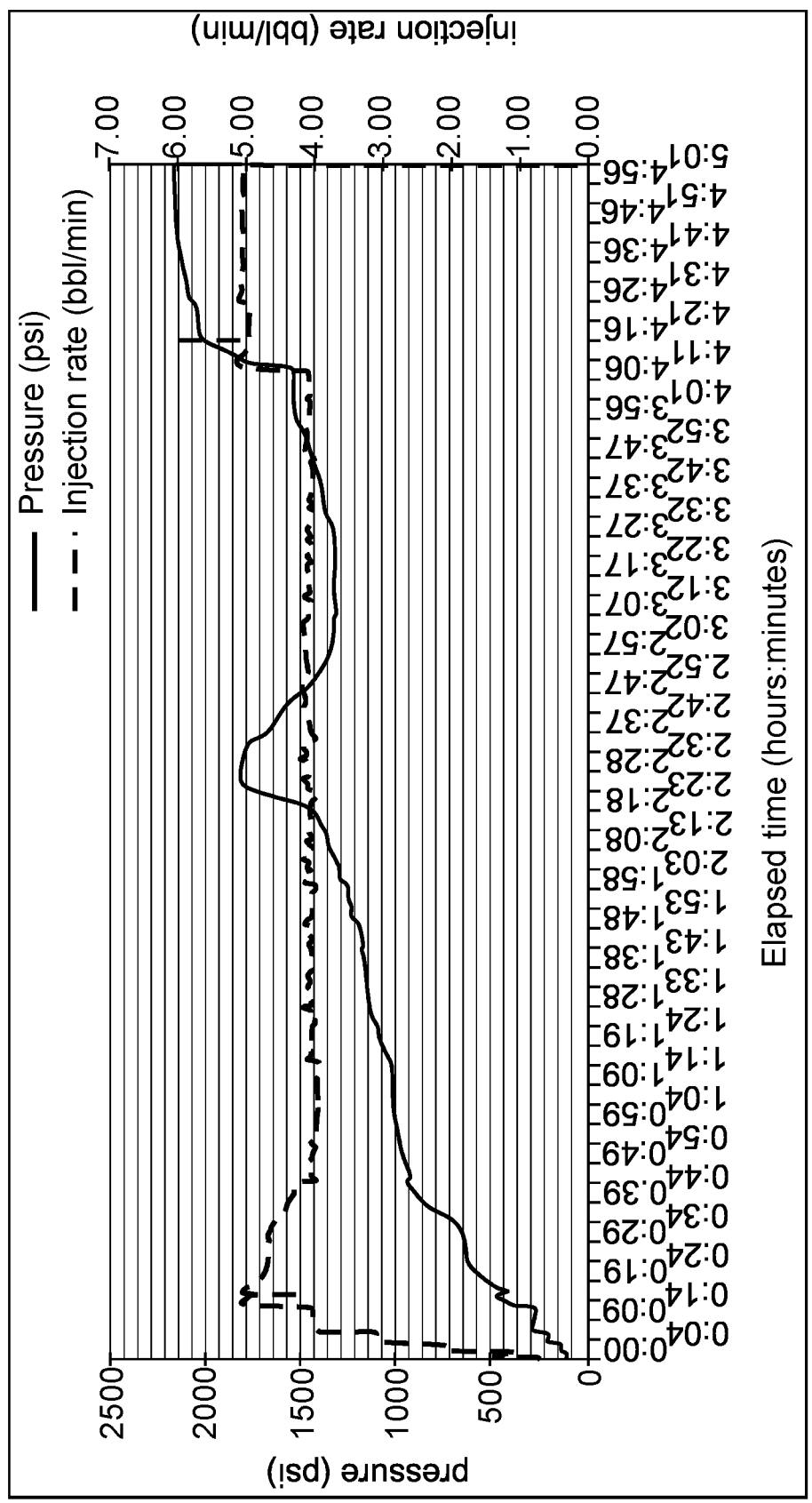
FIG. 2B shows the Injectivity #2 test on Well A, per one or more embodiments.

After performing the method of one or more embodiments, pumping began to fill the hole with water for Injectivity #2. The pumping of Injectivity #2 is shown in FIG. 2B and Table 3. At the outset, fresh water was introduced to fill the hole with water (starting at Entry 1, Table 3). Next, treated water was introduced to fill the hole with treated water (starting at Entry 8, Table 3). Injectivity #2 was stopped (Entry 15, Table 3) and a falloff test was performed. Results from Injectivity #2 are shown in FIG. 2B.

TABLE 3

Well A Injectivity #2, Example 1.

| Entry | Time (hour:minute) | Duration (hour:minute) | Injectivity (Injection rate in bbls/min) | Injectivity (Injection rate in bbls/day) | Injection Pressure (psi) | Volume (bbls) | Cumulative Volume (bbls) |
|---|---|---|---|---|---|---|---|
| 1 | 0:00 | | 1 | 1,440 | 91 | 0 | 0 |
| 2 | 0:02 | 0:02 | 2 | 2,880 | 125 | 2 | 2 |
| 3 | 0:04 | 0:02 | 3 | 4,320 | 193 | 8 | 10 |
| 4 | 0:07 | 0:03 | 4 | 5,760 | 280 | 17.5 | 27.5 |
| 5 | 0:14 | 0:07 | 5 | 7,200 | 395 | 55 | 82.5 |
| 6 | 0:33 | 0:19 | 5 | 7,200 | 659 | 135 | 217.5 |
| 7 | 0:44 | 0:11 | 4 | 5,760 | 934 | 185 | 402.5 |
| 8 | 1:41 | 0:57 | 4 | 5,760 | 1160 | 412 | 814.5 |
| 9 | 2:17 | 0:36 | 4 | 5,760 | 1408 | 557 | 1371.5 |
| 10 | 2:25 | 0:08 | 4 | 5,760 | 1806 | 587 | 1958.5 |
| 11 | 2:55 | 0:30 | 4 | 5,760 | 1372 | 710 | 2668.5 |
| 12 | 3:10 | 0:15 | 5 | 7,200 | 1768 | 1014 | 3682.5 |
| 13 | 4:01 | 0:51 | 5 | 7,200 | 2168 | 1269 | 4951.5 |
| 14 | 4:02 | 0:01 | 0 | — | 1108 | 1270 | 6221.5 |
| 15 | 4:11 | 0:09 | — | — | — | — | — |

Table 3 shows the improvement of injectivity after performing the method of one or more embodiments. The injection rate reached around 5.0 bbls/min (7,200 bbls/day) at an injection pressure around 2,168 psi. Therefore, the injectivity improvement due to one or more embodiments of the method and acid treatment fluid composition is around 5 times greater, compared to nearly zero injectivity (such as 0.5 to 0 in Table 2) prior to the job execution.

Well B

After the previous test procedures, the open hole of Well A collapsed. A cement plug was placed in the initial mother bore of open hole Well A. A new sidetrack was drilled, "Well B". Well B is a laterally accessible cased-hole completion in the Burgan (sandstone) Formation. Well B also entered the Shuaiba (carbonate) Formation.

Figure 3:
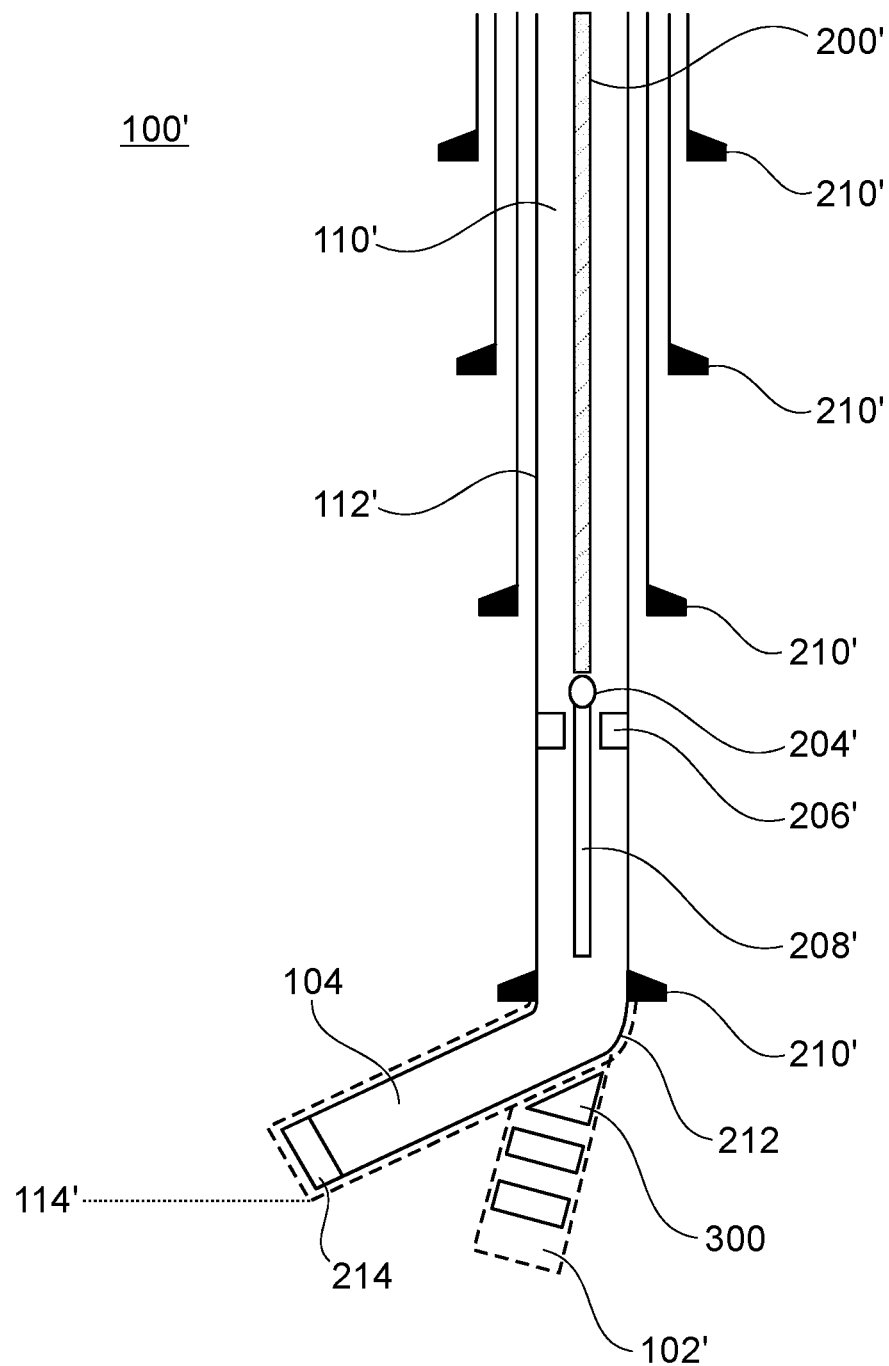
FIG. 3 shows detailed specifications of Well B and the casing design of Well B, per one or more embodiments.

FIG. 3 and Table 4 show detailed specification of Well B.

FIG. 3 shows a wellbore 100' of Well B 104 as a sidetrack of Well A 102', where

Well A has a plug 300 installed. The plug effectively blocks Well A from Well B. Well B is defined by a wellbore wall 112' and has a total depth 114'. An annular space 110' is between the wellbore wall and the tubing 200'. A packer 206' and casing (CSG) shoes 210' are installed as shown, and the tubing of FIG. 3 is coupled or connected to a circulating valve 204' and lower tubing 208'. FIG. 3 also shows a liner 212 and liner shoe 214 in Well B.

The total depth of Well B was 9,170' measured depth (MD), at 8,069' true vertical depth (TVD). After drilling Well B, a liner and a perforated liner were installed. A 1,781' length of liner was installed in Well B from 6,707' to 8,488'. Additionally, a 1,539' length of pre-perforated liner was installed in Well B from 7,106' to 8,645'. Well B has a CSG shoe at a depth of 6,935' (6,819' TVD). Well B includes a pre-perforated liner extending from the CSG shoe to the TD at 8650'.

TABLE 4

Well B Specifications.

| Entry | Detail | Specification |
|---|---|---|
| 1 | Open hole or Cased hole | Cased hole-deviated well |
| 2 | Max deviation (deg) | 42.97° at 6,881' measured distance (MD) |
| 3 | CV-DF (distance (ft) | 31' |
| 4 | Total depth (TD) in MD (feet) | 9,170' MD |
| 5 | TD in TVD (feet) | 8,069' true vertical depth (TVD) |
| 6 | Casing details | Casing 1: 9-5/8" (OD) top depth 0', bottom depth 6,935', 53.5 # L-80 |
| 7 | Liner details | Liner 1: 7", top depth 6,707', bottom depth 8,647', 26 # L-80 |
| 8 | Tubing details | Completion has not been run, currently the well has 5" drill pipe, top depth 0', bottom depth ±6,627', 19.5 # 4" drill pipe, top depth 6,627', bottom depth ±6,878', 14 # |
| 9 | Restriction min inner diameter (ID) (inches) | Surface toe initiator valve (TIV) = 2.25" 5" drill pipe drift inner diameter = 3.125" 4" drill pipe drift inner diameter = 2.438" |
| 10 | Perforation/port/plug depths (ft) | Pre-perforated liner: 7", 26 # L-80 From 7,106' to 8,645' = 1,539' total depth |
| 11 | Wellbore fluid details | 9.5-ppg weighted treated water |
| 12 | Formation details | Burgan (sandstone formation): ≈170° F. & ≈2,600-psi at 6,779' TVD (0.381-psi/ft) Shuaiba (carbonate formation): ≈173° F. & ≈2,650-psi at 8,032' TVD (0.328-psi/ft) |
| 13 | SIWHP/FWHP (psi) | Water injector-WHP = 0-psi |
| 14 | $H_2S$ | Burgan = N/A. Shuaiba = possible $H_2S$ |
| 15 | Working Pressure Limit | 5,000-psi |

Procedures conducted on Well B before the method of one or more embodiments include an injectivity test, a drill stem test (DST), a surface test, running coiled tubing, and a nitrogen ($N_2$) lifting procedure. These procedures were similar to those used on Well A.

After rig up, operators first made up a Bottom Hole Assembly (BHA). The BHA and equipment was pressure tested and nitrogen lifting began. The procedure for nitrogen lifting in Well B was substantially similar to the procedure in Well A. After the nitrogen lifting procedure, the rig prepped for an initial injectivity test.

The brine used in the nitrogen lifting procedure and Injectivity #1, #2, and #3 is detailed in Table 5. This brine was used for both wells A and B for injectivity tests. "1/r" is 1/density of the material.

TABLE 5

Brine mixture prepared for Well B.

| Additive | Concentration | Conc. Units | Quantity | Units | 1/r (gallon per pound (gal/lb)) |
|---|---|---|---|---|---|
| Fresh Water | 996 | gal/1000 gal | 14243 | gal | 1.00 |
| pH Adjuster (K-35) | 12 | lb/1000 gal | 176 | lb | 0.05 |
| Ammonium Chloride ($NH_4Cl$) | 422 | lb/1000 gal | 6222 | lb | 0.08 |
| Total | 1000 | gal | 14742 (351) | gal (bbls) | |

Well B: Injectivity #1 (Comparative Example 2)

Comparative Example 2 and Example 2 were performed in Well B. The interval tested in Well B was a depth of 6,935' to 8,650'. The height of this interval is 1,715'.

After making up the BHA and prior to running in hole with the coiled tubing, the rig performed a pre-acid injection test on Well B with treated water.

Figure 4:
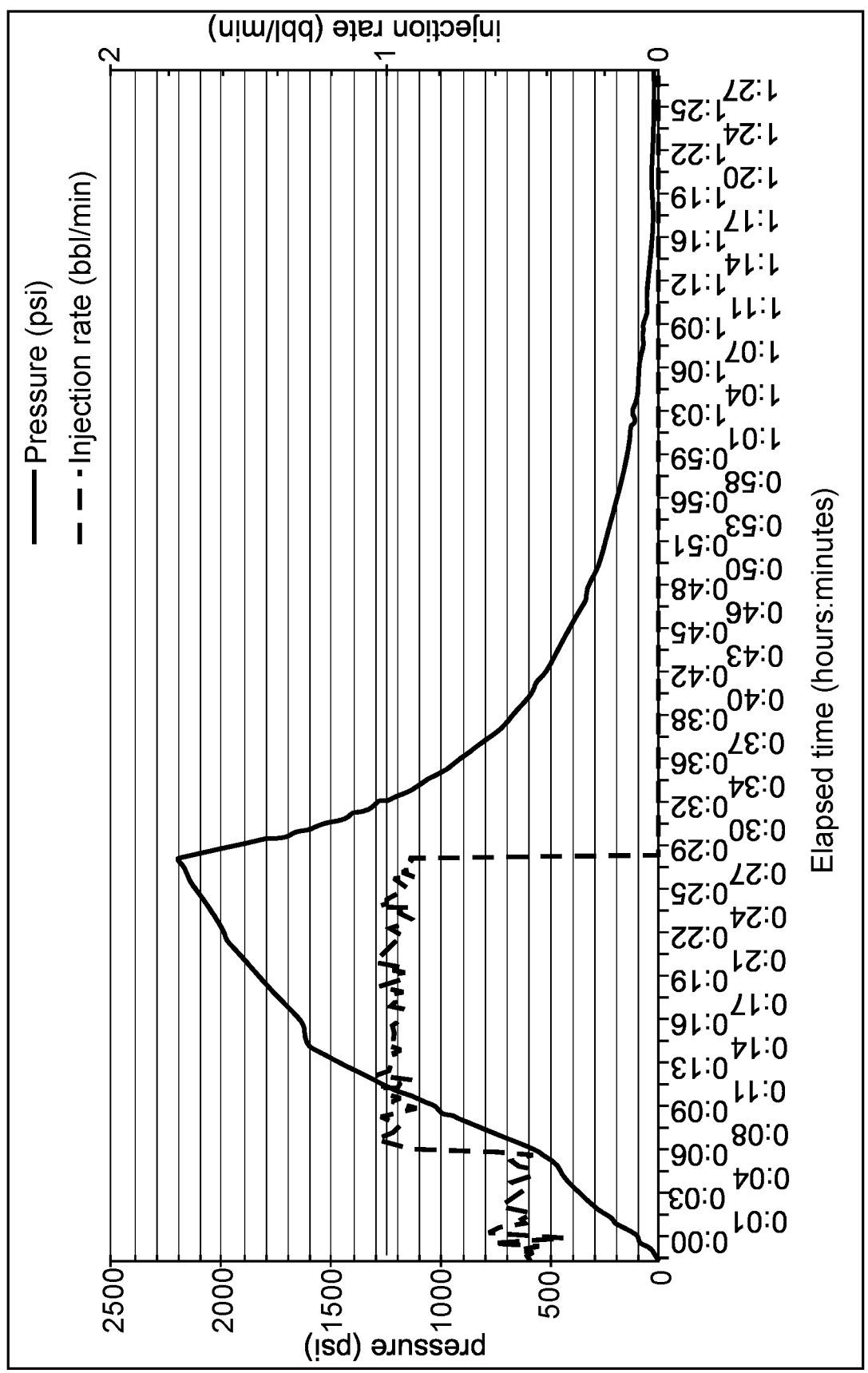
FIG. 4 shows the Injectivity #2 test on Well B, per one or more embodiments.

FIG. 4 and Table 6 detail the pressure (psi) versus injection rate (bpm) of the pre-acid stimulation injection test of Well B Injectivity #1 (Comparative Example 2).

TABLE 6

Well B Injectivity #1 (Comparative Example 2).

| Entry | Time (hour: minute) | Duration (hour: minute) | Injectivity (Injection rate in bbls/min) | Injectivity (Injection rate in bbls/day) | Injection Pressure (psi) | Volume (bbls) | Cumulative Volume (bbls) |
|---|---|---|---|---|---|---|---|
| 1 | 0:00 | — | 0.5 | 720 | 520 | 6 | 6 |
| 2 | 0:10 | 0:10 | 1 | 1440 | 2200 | 16 | 22 |
| 3 | 0:30 | 0:20 | 0 | — | 0 | 6 | 28 |

Brine was initially introduced at 0.5 barrels per minute (bpm) and the well head injection pressure gradually increased to about 500 psi (Entry 1, Table 6). The brine pumping rate was increased to 1.0 bpm, and well head pressure increased quickly to 1500 psi. This quick pressure increase was followed by a gradual pressure increase up to 2200 psi (Entry 2, Table 6), before stopping the injection (Entry 3, Table 6). The total volume of injected water of Comparative Example 2 was 28 bbls. The reservoir was still in its transient state, meaning that well head pressure (WHP) was increasing. At this point, Well B Injectivity #1 was terminated.

After Well B Injectivity #1, high pressure coiled tubing was performed in one run. The coiled tubing was run in hole and tagged at 8645'. Well head pressure was equalized before the isolation and gate valve were opened. Coiled tubing was run in hole. Pull tests were conducted on the coiled tubing once every 1000 ft while breaking circulation with brine at 1 barrel per minute (bpm).

The methods used in Well B include a single stage treatment with the steps of preparation, pre-flushing, flushing, over-flushing, and soaking.

The single stage treatment included well treatment compositions of one or more embodiments, including a flush pill (Table 7), an organic acid pill (Table 8), an inorganic acid pill (Table 9), and a neutralization pill (Table 10). These fluids were mixed and prepared prior to running the single stage treatment in Well B.

TABLE 7

Treated brine mixture prepared for pre-flush and post-flush pill.

| Additive | Concentration | Conc. Units | Quantity | Units | 1/r (gal/pound (lb)) |
|---|---|---|---|---|---|
| Fresh Water | 936 | gal/1000 gal | 8179 | gal | 1.00 |
| pH Adjuster (K-35) | 12 | lb/1000 gal | 104 | lb | 0.05 |
| Ammonium Chloride (NH$_4$Cl) | 422 | lb/1000 gal | 3687 | lb | 0.08 |
| Mutual Solvent | 30 | gal/1000 gal | 263 | gal | 1.00 |
| Total | 1000 | gal | 8736 | gal | |
| | | | (208) | (bbls) | |

TABLE 8

Organic acid pill.

| Additive | Concentration | Conc. Units | Quantity | Units | 1/r (gal/pound (lb)) |
|---|---|---|---|---|---|
| Fresh Water | 866 | gal/1000 gal | 14083 | gal | 1.00 |
| Formic Acid | 100 | gal/1000 gal | 1626 | gal | 1.00 |
| Corrosion Inhibitor (MSA-III) | 4 | gal/1000 gal | 66 | gal | 1.00 |
| Surfactant (LOSURF-259 ™) | 2 | gal/1000 gal | 33 | gal | 1.00 |
| Ammonium Chloride (NH$_4$Cl) | 350 | lb/1000 gal | 5689 | lb | 0.08 |
| Total | 1000 | gal | 16254 | gal | |
| | | | (387) | (bbls) | |

TABLE 9

Inorganic acid pill.

| Additive | Concentration | Conc. Units | Quantity | Units | 1/r (gal/pound (lb)) |
|---|---|---|---|---|---|
| Fresh Water | 670 | gal/1000 gal | 10897 | gal | 1.00 |
| 31% HCl | 295 | gal/1000 gal | 4795 | gal | 1.00 |
| Corrosion Inhibitor (MSA-III) | 5 | gal/1000 gal | 82 | gal | 1.00 |
| Surfactant (LOSURF-259 ™) | 2 | gal/1000 gal | 33 | gal | 1.00 |
| Ammonium Chloride (NH$_4$Cl) | 350 | lb/1000 gal | 5689 | lb | 0.08 |
| Total | 1000 | gal | 16254 | gal | |
| | | | (387) | (bbls) | |

TABLE 10

Neutralization pill introduced after acid stimulation treatment fluid.

| Additive | Concentration | Conc. Units | Quantity | Units | 1/r (gal/lb) |
|---|---|---|---|---|---|
| Fresh Water | 996 | gal/1000 gal | 419 | gal | 1.00 |
| pH Adjuster (K-35) | 85 | lb/1000 gal | 36 | lb | 0.05 |
| Total | 1000 | gal | 420 | gal | |
| | | | (10) | (bbls) | |

Table 11 shows the pumping schedule overview for Well B. Table 12 shows the pumping composition overview for Well B.

TABLE 11

Pumping schedule job for Well B Single stage treatment.

| Entry | Stage | Start | End | Length | CT Speed (fpm) | Direction |
|---|---|---|---|---|---|---|
| 1 | Run in hole to TD | 0 | 8,644' | 8,644' | 45 | RIH (running in hole) |
| 2 | Spot HCOOH mix | 8,644' | 8,250' | 400' | 20 | POOH (pulling out of hole) |
| 3 | Spot HCl mix | 8,250' | 7,850' | 400' | 20 | POOH |
| 4 | POOH to start of interval | 7,850' | 7,106' | 744' | 45 | POOH |
| 5 | Pre-flushing step | 7,106' | 8,645' | 1,539' | 20 | RIH |
| 6 | Flushing step (HCOOH) | 8,645' | 7,106' | 1,539' | 4 | POOH |
| 7 | Flushing step (HCl) | 7,106' | 8,645' | 1,539' | 4 | RIH |
| 8 | Displace CT volume | 8,645' | 7,106' | 1,539' | 25 | POOH |
| 9 | Post-flushing | Static | Static | 0 | 0 | Static |
| 10 | POOH to surface | 7,106' | 0 | 7,106' | 45 | POOH |
| 11 | Soaking step | — | — | — | — | — |

TABLE 12

Pumping schedule composition for Well B single stage treatment.

| Entry | Stage | Fluid | Rate | Vol. (bbl) | Acc. Vol. (bbl) | Choke (open = WHP of 500 psi) |
|---|---|---|---|---|---|---|
| 1 | Run in hole to TD | brine | 1 | 193 | 193 | open |
| 2 | Spot HCOOH mix | 10% HCOOH mixture | 1 | 20 | 213 | open |
| 3 | Spot HCl mix | 10% HCl mixture | 1 | 20 | 213 | open |
| 4 | POOH to start of interval | treated brine | 0 | 0 | 233 | shut-in |
| 5 | Pre-flushing step | treated brine (2 gal/ft) | 1 | 74 | 307 | shut-in |
| 6 | Flushing step (HCOOH) | 10% HCOOH mixture (10 gal/ft) | 1 | 367 | 674 | shut-in |
| 7 | Flushing step (HCl) | 10% HCl mixture (10 gal/ft) | 1 | 367 | 1041 | shut-in |
| 8 | Displace CT volume | treated brine | 1 | 60 | 1101 | shut-in |
| 9 | Post-flushing | treated brine (2 gal/ft) | 1 | 74 | 1175 | shut-in |
| 10 | POOH to surface | brine | 1 | 158 | 1333 | shut-in |
| 11 | Soaking step | — | — | — | — | — |

Steps of preparation, pre-flushing, flushing, post-flushing, and soaking are presented as follows.

Preparation of Well B included running the coiled tubing to a depth of 8,644' TD. While running coiled tubing, wellbore fluid was bottomed up by pumping brine (Entry 1, Tables 11 and 12). Next, coiled tubing was pulled out of hole 400' while spotting the organic acid pill and inorganic acid pill across the perforated interval (Entries 2 and 3, Tables 11 and 12). The spotting was followed by introducing treated brine and the coiled tubing was pulled out of hole to 7,106'. The well head was shut in (Entry 4, Tables 11 and 12).

The pre-flushing step included introducing the pre-flush pill across Well B (Entry 5, Tables 11 and 12). The flushing step included introducing the organic acid pill (Entry 6, Tables 11 and 12), followed by the inorganic acid pill (Entry 7, Tables 11 and 12). The coiled tubing was displaced with 60 bbls of treated brine while being pulled out of hole from 8,645' to 7,106' (Entry 8, Tables 11 and 12). The post-flushing step included introducing the post-flush pill while keeping the coiled tubing static (Entry 9, Tables 11 and 12). The coiled tubing was then pulled out of hole to the surface while being displaced with brine (Entry 10, Tables 11 and 12). The soaking step included 10 hours of soaking (Entry 11, Tables 11 and 12). The equipment was rigged down and the coiled tubing equipment was demobilized.

Well B: Injectivity #3 (Example 2) and Injectivity #4 (Example 3)

After the coiled tubing was pulled out of hole to the surface, Injectivity #3 (Example 2) and Injectivity #4 (Example 3) were performed with treated water.

Figure 5A:
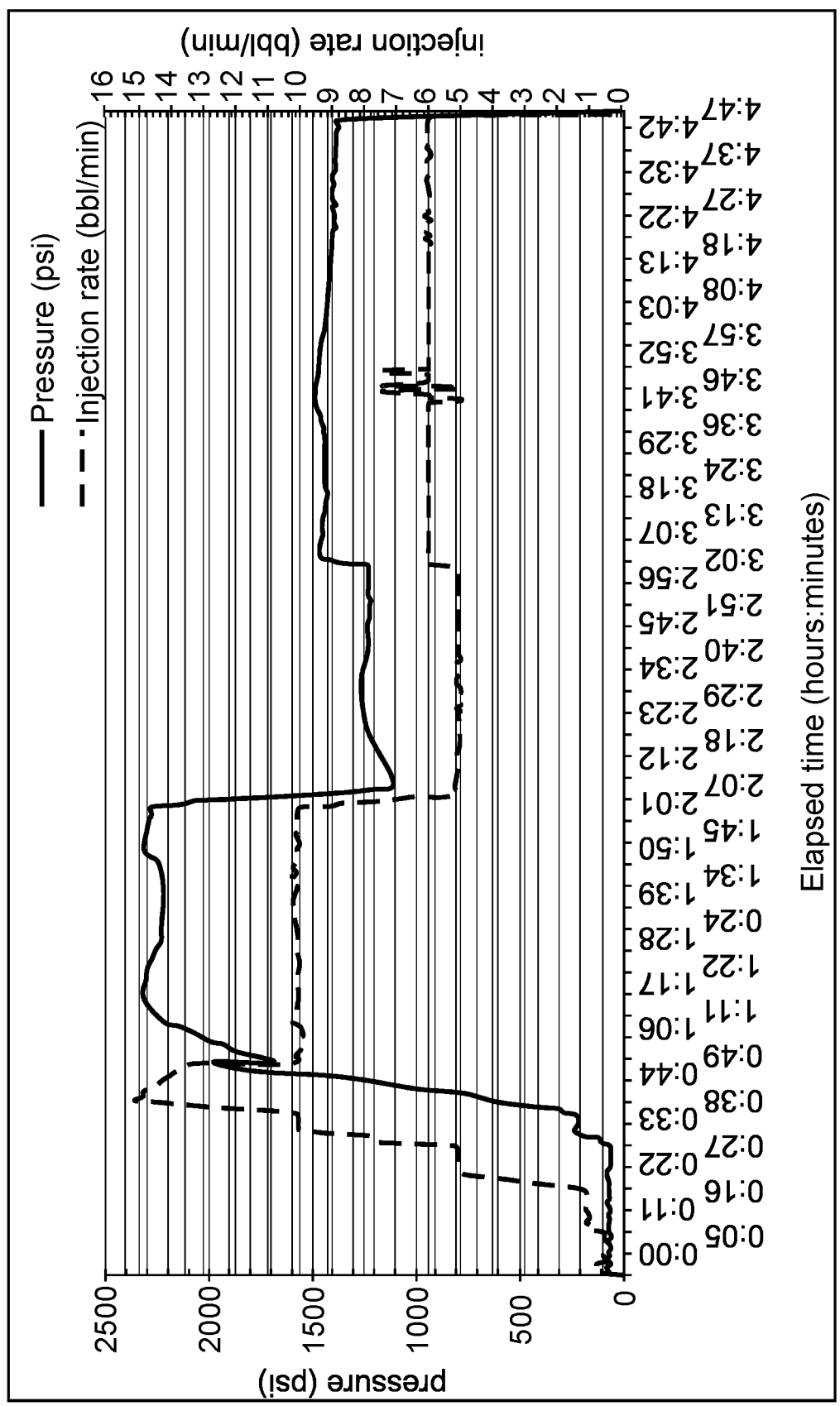
FIG. 5A shows the Injectivity #3 test on Well B, per one or more embodiments.
Figure 5B:
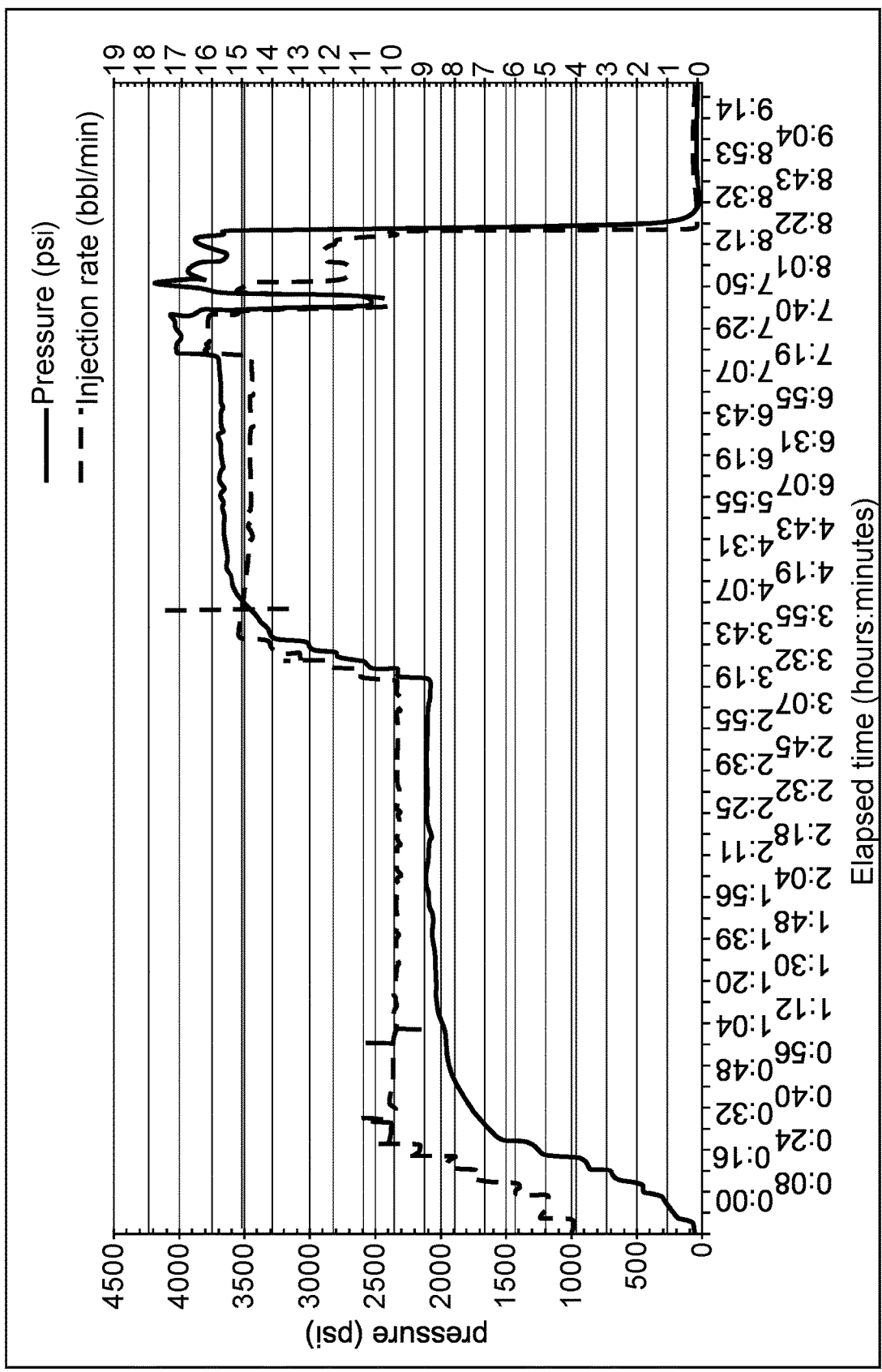
FIG. 5B shows the Injectivity #4 test on Well B, per one or more embodiments.

Details of Injectivity #3 (Example 2) are shown in FIG. 5A and Table 13. Details of Injectivity #4 (Example 3) are shown in FIG. 5B and Table 14.

TABLE 13

Well B Injectivity #3 (Example 2).

| Entry | Time (hour: minute) | Duration (hour: minute) | Injectivity (Injection rate in bbls/min) | Injectivity (Injection rate in bbls/day) | Injection Pressure (psi) | Volume (bbls) | Cumulative Volume (bbls) |
|---|---|---|---|---|---|---|---|
| 1 | 0:00 (start) | 0:25 (prior to start) | 1 | 1,440 | 55 | 27 | 28 |
| 2 | 0:11 | 0:11 | 5 | 7,200 | 53 | 65 | 93 |
| 3 | 0:16 | 0:05 | 10 | 14,917 | 237 | 50 | 142 |
| 4 | 0:28 | 0:12 | 15 | 21,600 | 1918 | 160 | 303 |
| 5 | 1:38 | 1:10 | 10 | 14,400 | 2288 | 693 | 996 |
| 6 | 2:36 | 0:58 | 5 | 7,200 | 1219 | 292 | 1288 |
| 7 | 4:26 | 1:50 | 6 | 8,644 | 1383 | 651 | 1940 |

After Injectivity #3 (Example 2) and before Injectivity #4 (Example 3) a flowmeter (production logging tool) was rigged up and run in hole to a depth of 7000'. Treated water was introduced and flowrate was recorded across Well B.

About 16 hours after Injectivity #3 (Example 2) was completed, Injectivity #4 began by introducing treated water at an injection pressure of 270 psi in the presence of the production logging tool. The injection rate was 5 bbls/min (7,200 bbls/day), resulting in a total of 95 bbls (Entry 1, Table 14).

The wireline could not pass 7106' and the procedure was stopped (after Entry 1, Table 14). Further attempts for the wireline to pass 7204' were unsuccessful. Next, Injectivity #4 continued (at Entry 2, Table 14). However, the wireline could not pass 7,160' (at Entry 4, Table 14), so the wireline with production logging tool was rigged down. Injectivity continued at Entry 5, Table 14.

TABLE 14

Well B Injectivity #4 (Example 3).

| Entry | Time (hour: minute) | Duration (hour: minute) | Injectivity (Injection rate in bbls/min) | Injectivity (Injection rate in bbls/day) | Injection Pressure (psi) | Volume (bbls) | Cumulative Volume (bbls) |
|---|---|---|---|---|---|---|---|
| 1 | 0:00 | 0:21 | 5 | 7,200 | 270 | 95 | 95 |
| 2 | 3:39 (after stopping Entry 1) | 2:39 | 10 | 14,400 | 2089 | 2099 | 2193 |
| 3 | 5:09 | 1:30 | 15 | 21,600 | 3670 | 1155 | 3348 |
| 4 | 6:09 | 1:00 | 15 | 21,600 | 3690 | 868 | 4216 |
| 5 | 7:09 | 1:00 | 15 | 21,600 | 3697 | 668 | 4884 |
| 6 | 7:31 | 0:22 | 16 | 23,040 | 4058 | 366 | 5250 |

Comparative Example 1 shows a maximum injectivity of 10 bbls/min (14,400 bbls/day) at Entries 5 and 6 (Table 2). These injection rates were provided at pressures from 1150 to 2400 psi.

Example 1 shows a maximum injectivity of 5 bbls/min (7,200 bbls/day) at entries 5-6 and 12-13 (Table 3). These injection rates were provided at pressures from 280 to 2168 psi. Injectivity following treatment was sustainable at 7,200 bbls/day, while Comparative Example 1 injectivities were not sustainable.

Comparative Example 2 shows a maximum injectivity of 1 bbl/min (1,440 bbls/day) at Entry 2 (Table 6). This injection rate was provided at a pressure of 2200 psi.

Example 2 shows a maximum injectivity of 15 bbls/min (21,600 bbls/day) at Entry 4 (Table 13). This injection rate was provided at a pressure of 1918 psi.

Example 3 shows a maximum injectivity of 15 to 16 bbls/min (21,600 to 23,040 bbls/day) at Entries 3-6 (Table 14). These injection rates were provided at pressures of 3670 to 4058 psi.

Between the Comparative Examples and Examples, the maximum injectivity was provided using the method of one or more embodiments in Examples 2 and 3 at 15 to 16 bbls (21,600 to 23,040 bbls/day) and at pressures of 1918 to 4058 psi.

After performing the single-stage method of one or more embodiments the maximum injectivity improved by 15 to 16 times in Examples 2 and 3 (21,600 to 23,040 bbls/day), compared to the maximum injectivity before running the method in Comparative Example 2 (1,440 bbls/day).

The maximum injectivity of the single-stage method of one or more embodiments improved by around 3 times in Examples 2 and 3 (21,600 to 23,040 bbls/day), compared to the maximum injectivity in the step-wise method of Example 1 (7,200 bbls/day).

The maximum injectivity of the step-wise method of Example 1 (7,200 bbls/day) did not improve over the maximum injectivity before running the step-wise method in Comparative Example 1 (14,400 bbls/day).

As previously discussed, Examples 2 and 3 provided a maximum injectivity of 21,600 to 23,040 bbls/day. This injectivity threshold was attained when using the composition and method of one or more embodiments. Where such composition and method were not used, as in Comparative Examples 1 and 2, the injectivity threshold of the examples, such as Examples 2 and 3 were not attained.

In addition, the injectivity threshold of Examples 2 and 3 were attained with the method of one or more embodiments that include a single-stage treatment with pre-flushing, flushing, post-flushing, and soaking for 10 hours. Further, injectivity was improved in Example 1 using the composition of one or more embodiments, although the desired injectivity threshold was not attained, such as the injectivity seen in Examples 2 and 3.

Furthermore, without the composition and method of one or more embodiments, raising the injection pressure was shown to be ineffective in reaching the injectivity threshold of Examples 2 and 3. The injectivity of Examples 2 and 3 (21,600 to 23,040 bbls/day) were provided at pressures from 1918 to 4058 psi using the composition and method of one or more embodiments. The minimum pressure of 1918 psi is lower than the maximum pressures to provide the best injectivity of Comparative Examples 1 and 2. Specifically, Comparative Example 1 provided an injectivity of 14,400 bbls/day at up to 2400 psi. Comparative Example 2 provided an injectivity of 1,440 bbls/day at a maximum pressure of 2200 psi.

Unless defined otherwise, all technical and scientific terms used have the same meaning as commonly understood by one of ordinary skill in the art to which these systems, apparatuses, methods, processes, and compositions belong.

The singular forms "a," "an," and "the" include plural referents, unless the context clearly dictates otherwise.

As used here and in the appended claims, the words "comprise," "has," and "include" and all grammatical variations thereof are each intended to have an open, non-limiting meaning that does not exclude additional elements or steps.

"Optionally" means that the subsequently described event or circumstances may or may not occur. The description includes instances where the event or circumstance occurs and instances where it does not occur.

When the word "approximately" or "about" are used, this term may mean that there can be a variance in value of up to ±10%, of up to 5%, of up to 2%, of up to 1%, of up to 0.5%, of up to 0.1%, or up to 0.01%.

Ranges may be expressed as from about one particular value to about another particular value, inclusive. When such a range is expressed, it should be understood that another one or more embodiments is from the one particular value to the other particular value, along with all particular values and combinations thereof within the range.

Although only a few example embodiments have been described in detail, those skilled in the art will readily appreciate that many modifications are possible in the example embodiments without materially departing from this disclosure. All modifications of one or more disclosed embodiments are intended to be included within the scope of this disclosure as defined in the following claims. In the claims, means-plus-function clauses are intended to cover the structures previously described as performing the recited function and not only structural equivalents, but also equivalent structures. It is the express intention of the applicant not to invoke 35 U.S.C. § 112(f) for any limitations of any of the claims, except for those in which the claim expressly uses the words 'means for' together with an associated function.

While one or more embodiments of the present disclosure have been described with respect to a limited number of embodiments, those skilled in the art, having benefit of this disclosure, will appreciate that other embodiments can be devised, which do not depart from the scope of the disclosure. Accordingly, the scope of the disclosure should be limited only by the attached claims.

What is claimed:

1. A method for treating a sandstone formation, comprising:
   introducing a pre-flush pill comprising an aqueous solution of a first brine, ammonium chloride, and a first mutual solvent into a wellbore so that the pre-flush pill contacts face of the sandstone formation;
   introducing a well treatment composition consisting essentially of an aqueous solution of ammonium chloride, an inorganic acid, an organic acid, and one or more selected from the group consisting of a pH adjuster, a mutual solvent, a surfactant, and a corrosion inhibitor, into the sandstone formation,
   where the inorganic acid does not comprise hydrofluoric (HF) acid;
   introducing a post-flush fluid comprising an aqueous solution of a second brine, ammonium chloride, and a second mutual solvent into the wellbore so that the post-flush fluid contacts the face of the sandstone formation; and
   maintaining the wellbore so that the well treatment composition interacts with the sandstone formation for a period.

2. The method of claim 1, wherein the first brine in the pre-flush pill and the second brine in the post-flush pill each comprise calcium chloride.

3. The method of claim 1, wherein the inorganic acid is HCl.

4. The method of claim 1, wherein the organic acid is HCOOH.

5. The method of claim 1, wherein the inorganic acid and the organic acid are present in the well treatment composition in a mass ratio in a range from 0.5:1 to 2:1.

6. The method of claim 1, wherein during the introduction of the well treatment composition, the organic acid is introduced into the sandstone formation before the inorganic acid.

7. The method of claim 1, where the period is in a range of from about 4 hours to about 24 hours.

8. A method for treating a sandstone formation with a well treatment composition, comprising:
   introducing a pre-flush pill comprising an aqueous solution of a first brine, ammonium chloride, and a first mutual solvent into a wellbore so that the pre-flush pill contacts a face of the sandstone formation;
   introducing an organic acid pill consisting essentially of an aqueous solution of ammonium chloride, an organic acid, and one or more selected from the group consisting of a pH adjuster, a mutual solvent, a surfactant, and a corrosion inhibitor, into the sandstone formation;
   introducing an inorganic acid pill consisting essentially of an aqueous solution of ammonium chloride, an inorganic acid, and one or more selected from the group consisting of a pH adjuster, a mutual solvent, a surfactant, and a corrosion inhibitor, into the sandstone formation,
   where the inorganic acid does not comprise hydrofluoric (HF) acid;
   introducing a post-flush fluid comprising an aqueous solution of a second brine, ammonium chloride, and a second mutual solvent into the wellbore so that the post-flush fluid contacts the face of the sandstone formation; and
   maintaining the wellbore so that the well treatment composition interacts with the sandstone formation for a period,
   where the well treatment composition is the organic acid pill and the inorganic acid pill.

9. The method of claim 8, wherein the first brine in the pre-flush pill and the second brine in the post-flush pill each comprise calcium chloride.

10. The method of claim 8, wherein the inorganic acid is HCl.

11. The method of claim 8, wherein the organic acid is HCOOH.

12. The method of claim 8, wherein the inorganic acid and the organic acid are present at a mass ratio in a range of from 0.5:1 to 2:1.

13. The method of claim 8, wherein the period is in a range of from about 4 hours to about 24 hours.

* * * * *